United States Patent
Choi et al.

(10) Patent No.: US 11,955,647 B2
(45) Date of Patent: Apr. 9, 2024

(54) METHOD FOR PREPARING NANOSPONGE-STRUCTURED GRAPHENE DOT-PALLADIUM HYBRID, AND NANOSPONGE-STRUCTURED GRAPHENE DOT-PALLADIUM HYBRID PREPARED THEREBY

(71) Applicant: The Industry & Academic Cooperation in Chungnam National University (IAC), Daejeon (KR)

(72) Inventors: Ho-Suk Choi, Daejeon (KR); Van Toan Nguyen, Daejeon (KR)

(73) Assignee: THE INDUSTRY & ACADEMIC COOPERATION IN CHUNGNAM NATIONAL UNIVERSITY (IAC), Daejeon (KR)

( * ) Notice: Subject to any disclaimer, the term of this patent is extended or adjusted under 35 U.S.C. 154(b) by 534 days.

(21) Appl. No.: 17/292,873

(22) PCT Filed: Nov. 16, 2018

(86) PCT No.: PCT/KR2018/014126
§ 371 (c)(1),
(2) Date: May 11, 2021

(87) PCT Pub. No.: WO2020/101085
PCT Pub. Date: May 22, 2020

(65) Prior Publication Data
US 2021/0408557 A1 Dec. 30, 2021

(51) Int. Cl.
*H01M 4/92* (2006.01)
*C01B 32/182* (2017.01)

(52) U.S. Cl.
CPC .................. *H01M 4/926* (2013.01)

(58) Field of Classification Search
CPC ............. H01M 4/926; C01B 32/182
USPC ............................................ 502/185
See application file for complete search history.

(56) References Cited

U.S. PATENT DOCUMENTS

2021/0005902 A1* 1/2021 Vu ............... H01M 4/8842

FOREIGN PATENT DOCUMENTS

| CN | 115025773 A | * | 9/2022 | .............. B01J 23/44 |
| KR | 101430397 B | * | 3/2014 | .............. B82B 1/00 |
| KR | 10-1600465 B1 | | 3/2016 | |
| KR | 10-2018-0033759 A | | 4/2018 | |

(Continued)

OTHER PUBLICATIONS

English translation of Written Opinion for PCT/KR2018/014126. (Year: 2019).*

(Continued)

*Primary Examiner* — Patricia L. Hailey
(74) *Attorney, Agent, or Firm* — Paratus Law Group, PLLC

(57) ABSTRACT

Disclosed are a method for preparing a graphene dot-palladium hybrid having a nanosponge structure that includes reducing a palladium precursor in the presence of a carbon dot and sodium bromide, and a graphene dot-palladium hybrid catalyst prepared according to the method. The nanosponge structure of the graphene dot-palladium hybrid is encapsulated by a graphene dot. The carbon dot is doped with at least one heteroatom selected from the group consisting of nitrogen, sulfur, phosphorus, and boron.

12 Claims, 7 Drawing Sheets

(56) References Cited

FOREIGN PATENT DOCUMENTS

| KR | 10-2019-0011210 A | | 2/2019 | | |
| KR | 20190011211 A | * | 2/2019 | ............ | B01J 23/652 |

OTHER PUBLICATIONS

S. E. Gilliland III et al., "Electrostatic adsorption-microwave synthesis of palladium nanoparticles on graphene for improved cross-coupling activity." Applied Catalysis A, General 550, pp. 168-175. (Year: 2018).*

Zhongping Li et al., "Graphene nanomaterials supported palladium nanoparticles as nanocatalysts for electro-oxidation of methanol." Journal of Electroanalytical Chemistry 805, pp. 47-52. (Year: 2017).*

Ayub Karimzadeh et al., "Electrochemical biosensing using N-GQDs: Recent advances in analytical approach." Trends in Analytical Chemistry 105, pp. 484-491. (Year: 2018).*

Van-Toan Nguyen et al., "N-doped Cdot/PtPd nanonetwork hybrid materials as highly efficient electrocatalysts for methanol oxidation and formic oxidation reactions." Journal of Alloys and Compounds 766, pp. 979-986. (Year: 2018).*

International Search Report for PCT/KR2018/014126 dated Aug. 7, 2019 from Korean Intellectual Property Office.

Quoc Chinh Tran et al., "Robust graphene-wrapped PtNi nanosponge for enhanced oxygen reduction reaction performance", Journal of Materials Chemistry A, Apr. 18, 2018, pp. 8259-8264, vol. 6.

Ho-Suk Choi et al., "N-Cdot/Pd Nanosponge with Enhanced Electrocatalytic Activity for Hydrogen Evolution Reaction and Methanol Oxidation Reaction", ECS Meeting Abstract, I01E Poster Session, Oct. 3, 2017, pp. 1.

Deepa Dey et al., "Carbon dot reduced palladium nanoparticles as active catalysts for carbon-carbon bond formation", Dalton Transactions, Jul. 30, 2013, pp. 13821-13825, vol. 42.

* cited by examiner

METHOD FOR PREPARING NANOSPONGE-STRUCTURED GRAPHENE DOT-PALLADIUM HYBRID, AND NANOSPONGE-STRUCTURED GRAPHENE DOT-PALLADIUM HYBRID PREPARED THEREBY

CROSS-REFERENCE TO PRIOR APPLICATION

This application is a National Stage Patent Application of PCT International Patent Application No. PCT/KR2018/014126 (filed on Nov. 16, 2018) under 35 U.S.C. § 371, which is hereby incorporated by reference in its entirety.

BACKGROUND

The present invention relates to a method for preparing a palladium nanocatalyst that is stable and has high effective surface areas and high catalytic activity, and a palladium nanocatalyst prepared by the method.

Fuel cells, a device for directly converting the chemical energy of fuels into electrical and thermal energy through electrochemical reactions, are considered a solution to the need of a new energy. The greatest advantage of fuel cells is that they have high efficiency, high energy density, low operating temperature, and low toxicity and produce electricity without generation of pollutants such as by-products of hydrocarbon combustion. Among the different types of fuel cells, the polymer electrolyte membrane fuel cell (PEMFC) is a practical candidate for various applications of electric power, and its commercialization is considered the most promising solution to the rapid increase in the energy demand and the intensified environmental contamination. PEMFCs generate electricity by combining the catalytic oxidation of the fuel occurring at the anode side and the oxygen reduction reaction (ORR) at the cathode side. In general, the ORR kinetics is very slow, so a cathode ORR catalyst is needed to speed up the ORR kinetics to a practical usable level in a fuel cell.

Hydrogen is also attracting attention as a promising renewable energy source that is clean and has high energy capacity. The hydrogen evolution reaction (HER) is one of the practical methods for producing hydrogen in an economical and efficient way.

At the current stage in technology, platinum (Pt)-based materials, which have high activity, low overvoltage, and small Tafel slope, are the most practical catalysts for oxygen reduction reaction (ORR) or hydrogen evolution reaction (HER). Because these Pt-based catalysts are too expensive, poor in durability and difficult to obtain, they are limited in their applications in the wider range and in large-quantity commercial processes.

Palladium (Pd), one of the platinum group elements, is similar to platinum in activity for the reactions known to be catalyzed by platinum, such as oxygen reduction reaction (ORR), oxidation reaction of methanol and formic acid in an alkali electrolyte solution, or hydrogen evolution reaction (HER), relatively inexpensive, highly durable, and easy to obtain. With these characteristics, palladium (Pd) is applied to various types of hydrogen gas sensors, hydrogen storage alloys, hydrogen separation devices, hydrogen reactors, and so forth. With a rough surface or a dendritic or porous structure, palladium nanoparticles have higher surface areas exposed to the catalytic reactions and hence higher catalytic activities than the conventional polycrystalline palladium. Accordingly, research is being conducted to boost the catalytic activities of the palladium catalyst by increasing the surface area of the palladium catalyst and preventing agglomeration of the palladium catalyst.

One pillar of the above research is to prepare a palladium catalyst having a three-dimensional porous structure. Yet, most of the conventional methods require surfactants, additives, strong reducing agents, toxic reagents, or high temperature reaction conditions. Even apart from the extreme reaction conditions, surfactants or additives are not easy to eliminate due to the interaction of the porous structure and polymer materials, and residual surfactants or additives tend to deteriorate the reaction activity.

Another pillar of the research is to develop catalysts composed of palladium nanoparticles on a carbon support having high surface areas, such as carbon black, carbon nanotubes, graphene, reduced products of graphene oxides, or amorphous carbon, as designed to reduce the agglomeration of the palladium nanoparticle catalysts and increase conductivity, making the current caused by the reaction flow efficiently (Korean Patent Registration Nos. 10-1144107, 10-1515677, and 10-0914991). However, palladium nanoparticle catalysts consisting of high-concentration palladium nanoparticles on the surface of a carbon support with an excellent particle distribution and a uniform distance between the particles are not easy to prepare, which is due to the severe agglomeration of palladium nanoparticles. Further, the carbon-supported catalysts undergo separation of catalytic metal nanoparticles from the carbon support and dissolution of the nanoparticles during the operation of the fuel cell, greatly reducing the effective surface area of the catalysts, which is the main cause of the deterioration of fuel cell performance. Furthermore, carbon supports have the property of bonding to other substances and get introduced between many nanocrystals in the manufacture of working electrodes, thereby reducing the effective surface area of the catalysts.

On the other hand, carbon dots (Cdots) are a new carbon material with unique properties that has attracted a lot of attention due to its recognized potential applicability in photoelectronic devices, energy storage and conversion equipment, solar cells, biosensors, and biotech. Carbon dots are oxygen-containing carbon nanoparticles having a quasi-spherical shape with a particle size of 10 nm or less. Containing a great amount of functional groups including oxygen on the surface, carbon dots have high hydrophilicity and act as both electron donors and electron acceptors. They can also be combined with a reducing agent such as ascorbic acid to form a structure used to stabilize metal nanoparticles in an aqueous solution. Carbon dots exhibit high electrical conductivity, very high surface areas, low toxicity, and chemical stability as well as biocompatibility. Hence, the fusion of carbon dots and metal nanoparticles creates inherent properties of a new hybrid and possibly results in enhancing catalytic, electrical and optical performances. Yet, only very limited studies have been made on the carbon dot/metal complexes. According to Guo et al., (*ACS Catalysis* 2015, 5, 2903), for example, it is reported that the stability can be greatly increased by encapsulating the surface of platinum nanoparticles with carbon dots. But, the cited catalyst is a catalyst supported on carbon nanotubes, and the carbon dot/metal complex itself does not have a three-dimensional structure.

SUMMARY

For solving the above-mentioned problems with the prior art, it is an object of the present invention to provide a method for preparing a palladium catalyst and a palladium catalyst prepared thereby, which palladium catalyst contains palladium at high concentration on the surface with high surface areas and thus exhibits excellences in catalytic activity, stability, and resistance to poisoning, resulting in high resistance to poisoning.

It is another object of the present invention to provide a synthesis method for preparing the palladium catalyst under mild conditions in a simple and economical way.

It is further another object of the present invention to provide an electrode for fuel cell including the palladium catalyst.

In order to achieve the objects, the present invention is directed to a graphene dot (Gdot)-palladium hybrid having a nanosponge structure as characterized by that a palladium precursor is reduced in the presence of carbon dots and sodium bromide.

In the present invention, the term "hybrid" is distinguished from the term "complex" that refers to a conventional metal nanostructure on a carbon support. In the carbon-supported catalyst, the nanostructure is physically and chemically bonded to the surface of the carbon support while maintaining the shape of the carbon support. In a catalyst using a platinum alloy supported on carbon nanotubes (CNTs), for example, platinum alloy nanoparticles are adsorbed on the surface, while entirely maintaining the shape of the carbon nanotubes. In contrast, the hybrid of the present invention does not have palladium nanoparticles adsorbed on the surface while entirely maintaining the shape of carbon nanotubes, but is characterized by a novel three-dimensional structure formed with palladium and graphene dots produced by exfoliation of the carbon dots during the reaction. The catalysts produced without carbon dots have a structure simply formed by agglomeration of a palladium alloy, whereas those produced in the presence of carbon dots have a nanosponge structure. Without sodium bromide in the present invention, in particular, the catalyst has a "nano-raspberry" structure rather than a porous nanosponge structure, which implicitly suggests that the sodium bromide along with the carbon dots acts as a structure-directing agent for a nanosponge structure. The catalyst with the nano-raspberry structure is far inferior in catalytic activity or durability to the nanosponge-structured Gdot-Pt hybrid of the present invention.

In particular, the graphene dot-palladium hybrid prepared by the present invention has a nanosponge structure encapsulated by the graphene dots (Gdots). That is, is surrounded by the graphene dots having a very thin-layered structure. This means that multi-layer quasisquare carbon dots are exfoliated into a sheet of graphene dots. Due to this encapsulated structure, the graphene dot-palladium hybrid of the present invention has higher durability as a catalyst than the conventional commercialized cPt/C catalyst or the Cdot-Pd hybrid having a nano-raspberry structure produced without sodium bromide. The Cdot-Pd hybrid, without sodium bromide, does not form a Gdot-encapsulated structure.

The carbon dots are more preferably carbon dots doped with a heteroatom. The heteroatom may be at least one selected from the group consisting of nitrogen, sulfur, phosphorus, and boron. Heteroatom doping not only increases the hydrophilicity of the surface, but also improves the properties of Cdots, such as enhancing the characteristics of Cdots as electron donors and electron acceptors and facilitating the introduction of functional groups. Therefore, the Gdot-Pd hybrid prepared using heteroatom-doped carbon dots has far higher catalytic activity than that prepared using carbon dots without heteroatom doping. Although the following embodiments describe the results of N-Cdots as heteroatom-doped carbon dots in detail, both the Cdots as described in the embodiments and Cdots doped with another heteroatom have a similar nanosponge structure. As for the preparation methods of Cdots or heteroatom-doped Cdots, various preparation methods have been reported in the prior art. But, the present invention may use carbon dots prepared by either preparation method, for it is not directed to the preparation method for Cdot or heteroatom-doped Cdot. Thus, a detailed description of the preparation method for Cdot or heteroatom-doped Cdot will be omitted in this specification.

When heteroatom-doped Cdots are used, the amount of the heteroatom dopant is preferably 20 wt. % with respect to the total weight of carbon. An excess of the heteroatom dopant not only makes it difficult to form Cdots, but also deteriorates the effect of the Cdots as a structure-directing agent during the reduction of the palladium precursor.

The palladium precursor may be any palladium precursor containing palladium ions so long as it can be reduced into palladium. Examples of the palladium precursor may include, but not limited to, sodium tetrachloropalladate ($Na_2PdCl_4$), potassium tetrachloropalladate ($K_2PdCl_4$), potassium hexachloropalladate ($K_2PdCl_6$), ammonium tetrachloropalladate (($NH_4$)$_2PdCl_4$), ammonium hexachloropalladate (($NH_4$)$_2PdCl_6$), palladium chloride ($PdCl_2$), or mixtures thereof.

The reaction preferably uses 1 to 200 parts by weight of carbon dots and 50 to 2000 parts by weight of sodium bromide with respect to 100 parts by weight of the platinum precursor. When the content of carbon dots or sodium bromide is too low, the function of carbon dots or sodium bromide as a structure-directing agent is insufficient, making it difficult to form a nanosponge structure. In contrast, when the content of carbon dots is too high, the metal content that indicates the catalytic activity becomes relatively low to deteriorate the catalytic activity. Further, the content of sodium bromide too high not only increases the production cost, but also adversely affects the formation of the nanosponge structure.

The reduction of the palladium precursor may be conducted using any method available in the preparation of the conventional palladium nanoparticles. In other words, it may be achieved by simply heating or adding a reducing agent. Examples of the reducing agent may include, but not limited to, any mixture of at least one or two selected from the group consisting of formic acid, ascorbic acid, citric acid, oleylamine, formaldehyde, sodium borohydride, aluminum borohydride, lithium aluminum hydride, and 2-methyl-2-pyrrolidine. The temperature for the reduction reaction is in the range of 20 to 180° C., and appropriate conditions can be selected depending on whether a reducing agent is used, or the type of the reducing agent.

The present invention is also directed to a graphene dot-palladium hybrid catalyst having a nanosponge structure and a catalyst electrode to which the catalyst is applied. The graphene dot-palladium hybrid has a nanosponge structure encapsulated by graphene dots. More preferably, the graphene dots are heteroatom-doped graphene dots. The graphene dot-palladium hybrid catalyst of the present invention can be used in all fields where platinum-based metal catalysts are used. In other words, examples of the reaction using the graphene dot-palladium hybrid catalyst of the present invention may include, but not limited to, the oxygen reduction reaction at the cathode side of the fuel cell, the oxidation reaction of methanol or formic acid, or the hydrogen evolution reaction. The graphene dot-palladium hybrid of the present invention has high electrochemically effective surface area as a benefit of its porous nanosponge structure and exhibits high catalytic activity due to the additional electrical conductivity of the graphene dots. For example, the graphene dot-palladium hybrid shows higher catalytic activity for the hydrogen evolution reaction and the methanol oxidation reaction than the carbon-supported platinum catalysts commercially available. In addition, the results of a chronoamperometry or CO stripping test show that the graphene dot-palladium hybrid has high durability, as demonstrated by a little change in the electron density over time and a resistance to poisoning.

As described above, the graphene dot-palladium hybrid prepared by the method of the present invention has a high effective surface area due to its nanosponge structure and accelerates the movement of electrons with the electrical conductivity of the graphene dots, so it is far superior in the catalytic activities to the commercial cPt/C catalysts. Besides, with the Gdot-encapsulated surface, it has excellent resistance to poisoning and only a little change in the electron density over time, exhibiting remarkably high durability, which makes it available as an alternative to expensive platinum catalysts.

In addition, the graphene dot-palladium hybrid of the present invention can be obtained by a simple preparation method, which involves mild reaction conditions and thus enables the preparation of catalyst in an economical manner.

DETAILED DESCRIPTION

Figure 1:
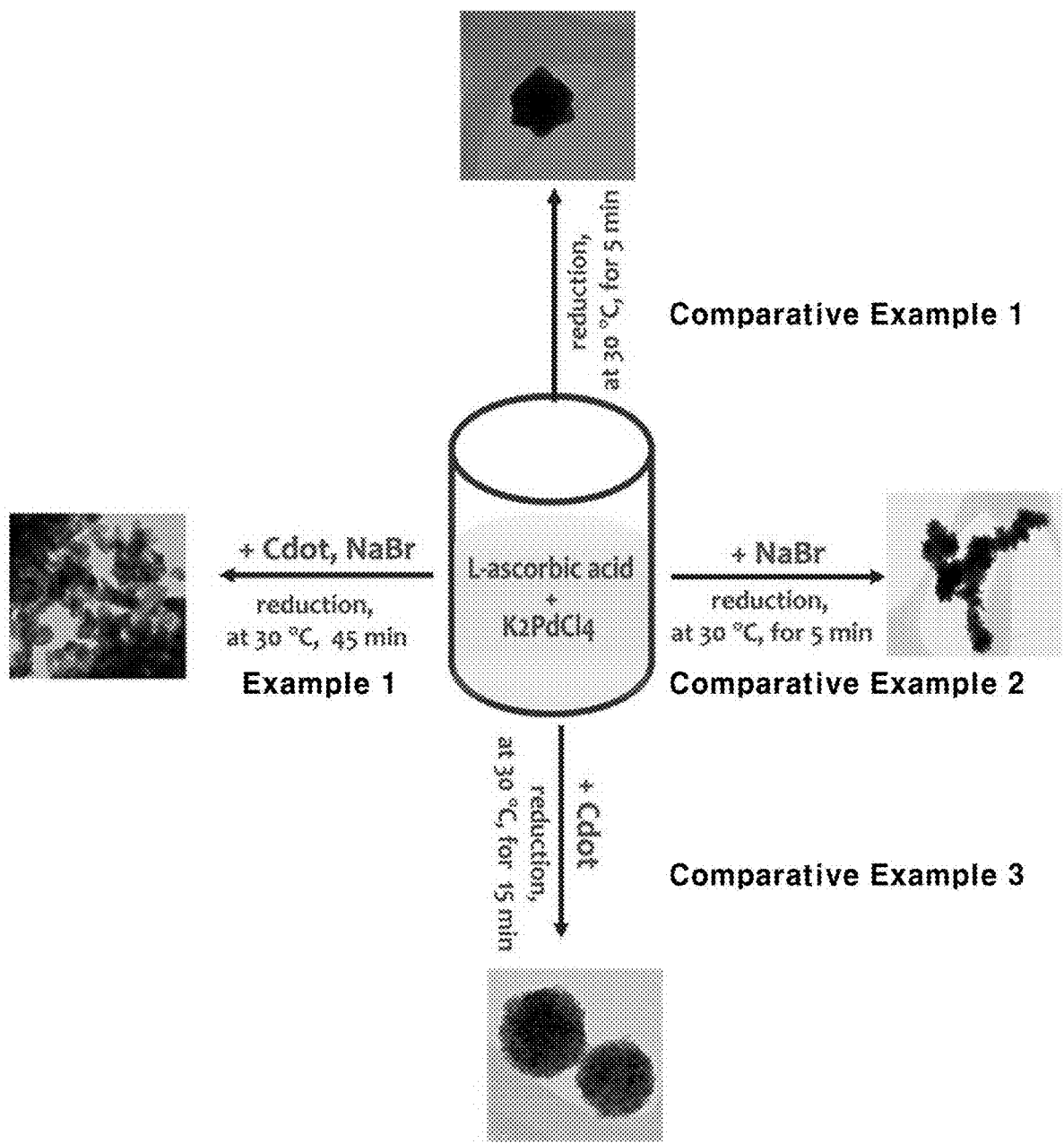
FIG. 1 is a schematic diagram illustrating the preparation methods for nano-structures according to the example of the present invention and comparative examples.

Hereinafter, the present invention will be described in detail with reference to the following examples, which are given as exemplary illustrations for the understanding of the contents and the scope of the technical conceptions of the present invention and not intended to limit and modify the technical scope of the present invention. But, it is apparent to those skilled in the art that various changes and modifications can be made within the scope of the technical conceptions of the present invention based on the exemplary illustrations.

EXAMPLES

Example 1: Preparation of Graphene Dot-Palladium Hybrid (1) Preparation of Nitrogen-Doped Graphene Dot-Palladium Hybrid Preparation of Nitrogen-Doped Carbon Dot (Cdot)

Nitrogen-doped carbon dot (N-Cdot) was prepared according to the method described in *Angewandte Chemie International Edition* 2013, 52, 7800. Briefly, 40 g of citric acid and 1.24 g of glycine were dissolved in 10 ml of DI water. The solution was heated at 70° C. for 12 hours to evaporate the solvent, and the residue was put into an autoclave and heated at a rate of 4.3° C./min to undergo a hydrothermal reaction at 200° C. for 3 hours. The product obtained in the form of black syrup was neutralized with a 1.0M NaOH solution and diluted with 100 ml of DI water. The diluted solution was dialyzed against secondary DI water through a dialysis membrane (5 kDa MWCO). The dialysis solution was freeze-dried to obtain a yellowish Cdot. According to the TEM analysis, the N-Cdot thus obtained had a spherical form with a diameter of 1.5 to 2.5 nm.

Preparation of Nitrogen-Doped Graphene Dot-Palladium (Gdot-Pd) Hybrid 29 mg of the nitrogen-doped Cdot prepared above, 400 mg of sodium bromide (NaBr, Sigma-Aldrich), and 34 mg of potassium tetrachloropalladate ($K_2PdCl_4$, Sigma-Aldrich) were put into a 100 ml round flask and subjected to ultrasonic waves for 20 minutes. Then, 20 ml of an aqueous solution of 28.4 mM L-ascorbic acid (L-aa, Sigma-Aldrich) was rapidly added to the mixed solution. Once the color of the clear reactant solution turned from yellowish brown into black, a centrifugation was conducted at 800 rpm for 5 minutes to obtain a product, which was washed with water and ethanol several times and dried out at 70° C. for 2 hours.

(2) Preparation of Graphene Dot-Palladium Hybrid

Preparation of Carbon Dot (Cdot)

Carbon dot (N-Cdot) was prepared according to the method described in *Carbon* 2016, 96, 139-144. Briefly, 3 g of citric acid (Ducsan Chemicals) and 3 g of urea (Shinyo Chemical) were added to 10 ml of DI water. The solution was vigorously agitated and then treated in a microwave oven (700 W) for 4 minutes. The resultant solution in dark brown was cooled down to the room temperature and centrifuged at 7000 rpm for 30 minutes to remove a large black aggregate. The supernatant containing the Cdot was neutralized and then washed with DI water several times. The black Cdot thus obtained was collected and dried out in a vacuum oven.

The dried Cdot was dispersed in ethanol and dropped on a mica substrate to prepare a specimen. Then, a multiMod 8 (Bruker) microscope was used to obtain a tapping mode AFM image of the specimen. According to the results of observation, the Cdot had an average particle diameter of 1.2 nm and a spherical form with a Gaussian distribution.

Preparation of Graphene Dot-Palladium (Gdot-Pd) Hybrid

The procedures were performed to prepare a Gdot-Pd hybrid in the same manner as described in the preparation of the nitrogen-doped Gdot-Pd hybrid, excepting that the Cdot prepared above was used in place of the nitrogen-doped Cdot.

Comparative Example 1: Preparation of Pd Nano-Structure 34 mg of potassium tetrachloropalladate ($K_2PdCl_4$) was dissolved in 50 ml of DI water in a 100 ml round flask, and 20 ml of an aqueous solution of 28.4 mM L-ascorbic acid was rapidly added to the solution. The reactant solution was agitated for 2 minutes and stood in an oven at 30° C. for 5 minutes. Once the color of the clear reactant solution turned from yellowish brown into grayish brown, a centrifugation was conducted at 800 rpm for 5 minutes to obtain a product, which was washed with water and ethanol several times and dried out at 70° C. for 2 hours.

Comparative Example 2: Preparation of Pd Nano-Structure

The procedures were performed to prepare a Pd nano-structure in the same manner as described in Comparative Example 1, excepting that 400 mg of sodium bromide along with potassium tetrachloropalladate was dissolved and put into reaction at 30° C. for 20 minutes.

Comparative Example 3: Preparation of Carbon Dot-Palladium Hybrid

The procedures were performed to prepare a carbon dot-palladium hybrid in the same manner as described in Example 1, excepting that the reaction was activated at 30° C. for 20 minutes without using sodium bromide (NaBr).

Once the color of the clear reactant solution turned from yellowish brown into grayish brown, a centrifugation was conducted at 800 rpm for 5 minutes to obtain a product, which was washed with water and ethanol several times and dried out at 70° C. for 2 hours.

In the preparation of nanoparticles of the Example and the Comparative Examples, the nanoparticles of Example 1 and Comparative Example 2 using sodium bromide (NaBr) had a slower change in the color of the reactant solution than those of Comparative Examples 1 and 3 not using NaBr. This implicitly suggested that the reduction rate of the Pd precursor was reduced by the presence of NaBr.

FIG. 1 shows the reactions of Example 1 and Comparative Examples in comparison.

Example 2: Analysis of Structural Characteristics of Graphene Dot-Palladium Hybrid The morphological characteristics of the Gdot/Pd hybrid prepared in Example 1 were analyzed with a field emission scanning electron microscope (FE-SEM, JSM-7000F, JEOL, Japan), a transmission electron microscope (TEM, JEM-2010HR), and high-resolution transmission electron microscope (HRTEM, JEM-2100F, JEOL, Japan). The specimen was dispersed in ethanol, dropped on a carbon-coated copper TEM grid (TED Pella, Redding, USA), and dried in the normal temperature and pressure conditions.

Figure 2:
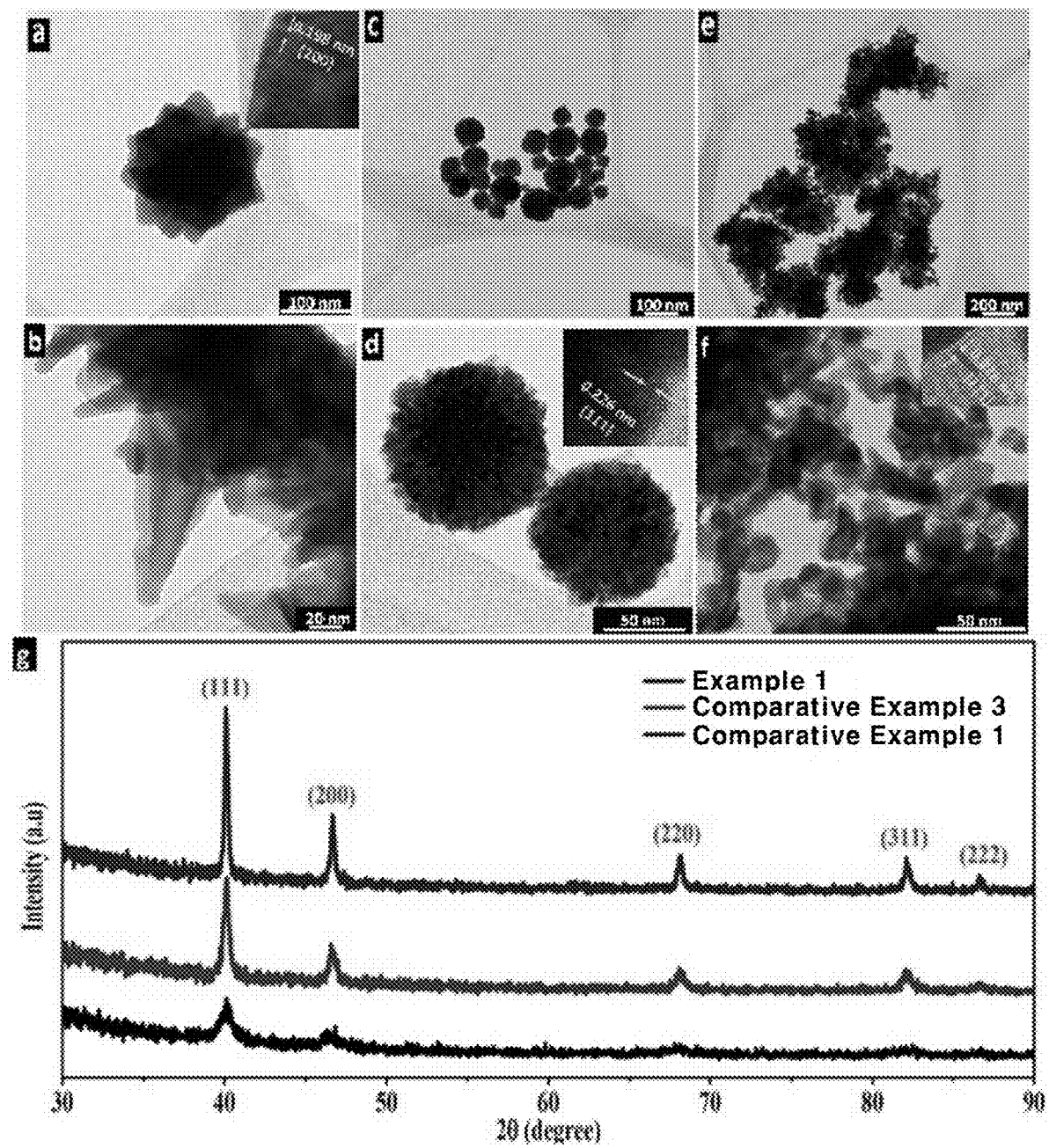
FIG. 2 presents HR-TEM images and XRD spectra of a Gdot-Pd hybrid prepared by the example of the present invention and nanoparticles of the comparative examples.

FIG. 2 presents the HR-TEM images of the nano-structures prepared according to Comparative Example 1 in (a), Comparative Example 2 in (b), Comparative Example 3 in (c) and (d), and Example 1 in (e) and (f); and XRD patterns in (g). It was shown that the Gdot-Pd hybrid of Example 1 entirely had a porous nanosponge structure. Contrarily, when the Pd precursor was reduced without Cdot, Pd particles densely agglomerated irrespective of the presence of sodium bromide (NaBr). The Pd particles prepared by reduction without NaBr had an almost uniform particle size and a typical d-spacing corresponding to the nano-icosahedral structure ((a) of FIG. 2 (scale bar 100 nm)). In the Comparative Example 2 using sodium bromide (NaBr) added during the reduction of Pd, there was formed a nano-structure having a bumpy surface, which was also a densely agglomerated structure ((b) of FIG. 2 (scale bar 20 nm)). In the Comparative Example 3 using C-dot alone during the reduction of the Pd precursor had a nano-raspberry structure with a size of about 50 to 100 nm in which very tiny spherical nanoparticles agglomerated ((c) and (d) of FIG. 2 (scale bar 100 and 50 nm)). The d-spacing of the Pd nano-raspberry structure was about 0.226 nm as originated from the plane (111), which was dominant as can also be seen from the XRD data. This implicitly suggested that the Cdot played an important role in the formation of the structure. The Gdot-Pd hybrid of Example 1 using sodium bromide (NaBr) along with the Cdot had a three-dimensional nanosponge structure as can be seen in (e) (scale bar 200 nm) and (f) (scale bar nm). In the HR-TEM images, the d-spacing was 0.266, which corresponded to the plane (111) of Pd. The XRD patterns revealed that the Gdot-Pd hybrid having a nanosponge structure was superior in crystallinity than the nanoparticles of the comparative examples.

Figure 3:
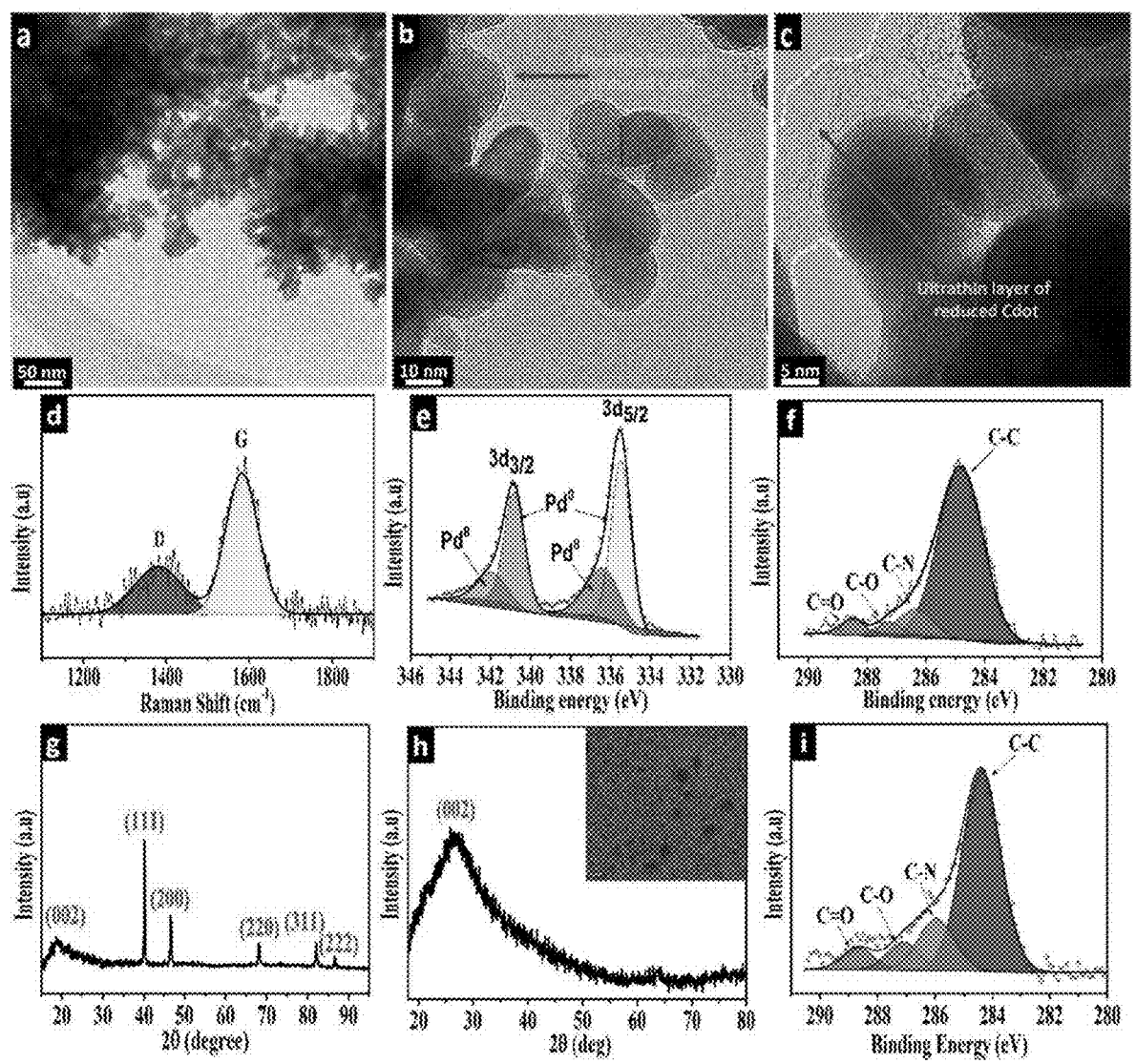
FIG. 3 presents HR-TEM images and XRD spectra showing the structural characteristics of the Gdot-Pd hybrid.

The structure was further identified from the HR-TEM images, the Raman spectrum, the XPS spectrum, and the XRD spectrum of FIG. 3. In FIG. 3, (a), (b) and (c) (scale bar 50, 10 and 5 nm, respectively) present the HR-TEM images of the Gdot-Pd hybrid prepared in Example 1, showing that the nanoparticles are connected to each other to form a three-dimensional network having a nanosponge structure. The structure is totally different from that of the nanoparticles prepared in the Comparative Examples. This implicitly suggested that both Cdot and NaBr played an important role in forming the nanosponge structure.

As can be seen from the enlarged diagram (c) of FIG. 3, the porous nanosponge structure was surrounded by the reduced Gdot having a thin-layered form (as indicated by an arrow in the figure). This implicitly suggested that quasisquare-shaped Cdot having a multi-layered structure was exfoliated in the reaction process to produce sheet-shaped Gdot, which encapsulated the nanosponge structure. In contrast, the Cdot-Pt hybrid prepared without using sodium bromide (NaBr) in the Comparative Example 3 had nanoparticles not surrounded by Cdot or Gdot as can be seen from the enlarged diagram (Data not shown). The Raman spectrum ((d) of FIG. 3) showed the D peak of disordered carbons and the G peak of the graphite carbon, indicating that a Gdot layer was formed on the nanoparticles. A signal for the carbon material near 20° along with the peaks indicating the crystalline structure of Pd was detected in the XRD spectrum ((g) of FIG. 3), showing that Gdot was included in the nanosponge. The peak of C (carbon) was very broad, which implicitly suggested that only a carbon in the graphite form was included, with no crystalline form, and that the size of the Gdot was very small. In FIG. 3, (h) presents the TEM images and XRD spectrum of the Cdot used in the preparation of the Gdot-Pd hybrid, where the Cdot was a spherical particle having a size of 2 to 5 nm as indicated by a very broad XRD peak. (e) and (f) present the XPS spectra for Pd 3d and C is in the Gdot-Pd hybrid, respectively; and (i) presents the XPS spectrum of the Cdot used in the preparation of the hybrid. In comparison of (f) and (i) in FIG. 3, the peak for the sp2 graphite C (C—C) was slightly blue-shifted in the hybrid relative to the Cdot, which implicitly suggested that the Gdot produced by the reduction of the Pd precursor was also partly reduced.

Example 3: Evaluation of Catalytic Activities of Gdot-Pd Hybrid

Preparation of Working Electrode 10 ml of 2-propanol, 29.8 ml of DI water, and 0.2 ml of 5 w % Nafion solution were mixed to prepare a stock solution. 0.5 ml of the stock solution and 0.5 mg of the Gdot-Pd hybrid having a nanosponge structure as prepared in (1) of Example 1 were added into a 2 ml vial and blended with a vortex mixer (KMC-1300V) for 5 minutes. Then, the resultant solution was processed with a sonicator at a temperature of 30° C. or below for 30 minutes to prepare a homogeneous catalyst ink.

A glassy carbon rotating disc electrode was ground with a suspension of 1 μm grinding diamond and then with a suspension of 0.05 μm $Al_2O_3$ particles. The ground electrode was washed with DI water, sonicated together with DI water for 5 minutes, and dried out at the room temperature for 30 minutes.

3 μl of the catalyst ink prepared above was drop-cast on the dried glassy carbon electrode, and the catalyst film thus obtained was dried at the room temperature for 30 minutes to complete a working electrode.

Electrochemical Measurement

The electrochemical measurement was performed in a three-electrode cell equipped with an ALS rotating disc electrode (RDE) device and an IVIUM potentiostat. A platinized Pt mesh was used as a count electrode, and Ag/AgCl (3M Cl) was a reference electrode. The electrolyte was a nitrogen-saturated aqueous solution of 0.5M $H_2SO_4$.

For cyclic voltammogram (CV) measurement, the three-electrode cell was purged with ultrahigh-pure nitrogen for 30 minutes. The measurement was performed at a scanning rate of 50 mV/s in the voltage range of 0.05V to 1.20V while purging with nitrogen.

For a comparison, a working electrode was prepared using a commercial Pt/C(c-Pt/C) catalyst (20% Pt on Vulcan XC-72, Alfa Aesar) or the nanoparticle of Comparative Example 1 or 2 in place of the Gdot-Pd nanosponge, and the procedures were performed in the same manner as described above to perform an electrochemical measurement.

Figure 4:
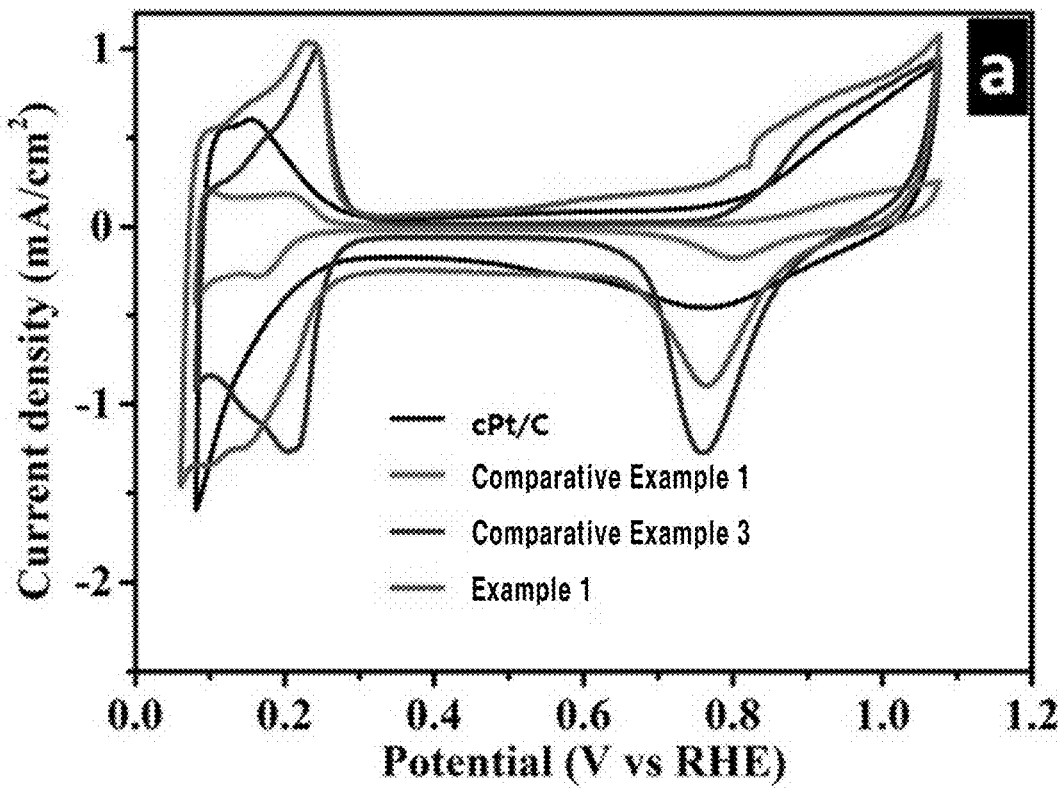
FIG. 4 presents CV curves showing the electrochemical characteristics of the Gdot-Pd hybrid and a graph of the effective surface area (ECSA, electrochemical surface area) calculated from the CV curves.
Figure 4:
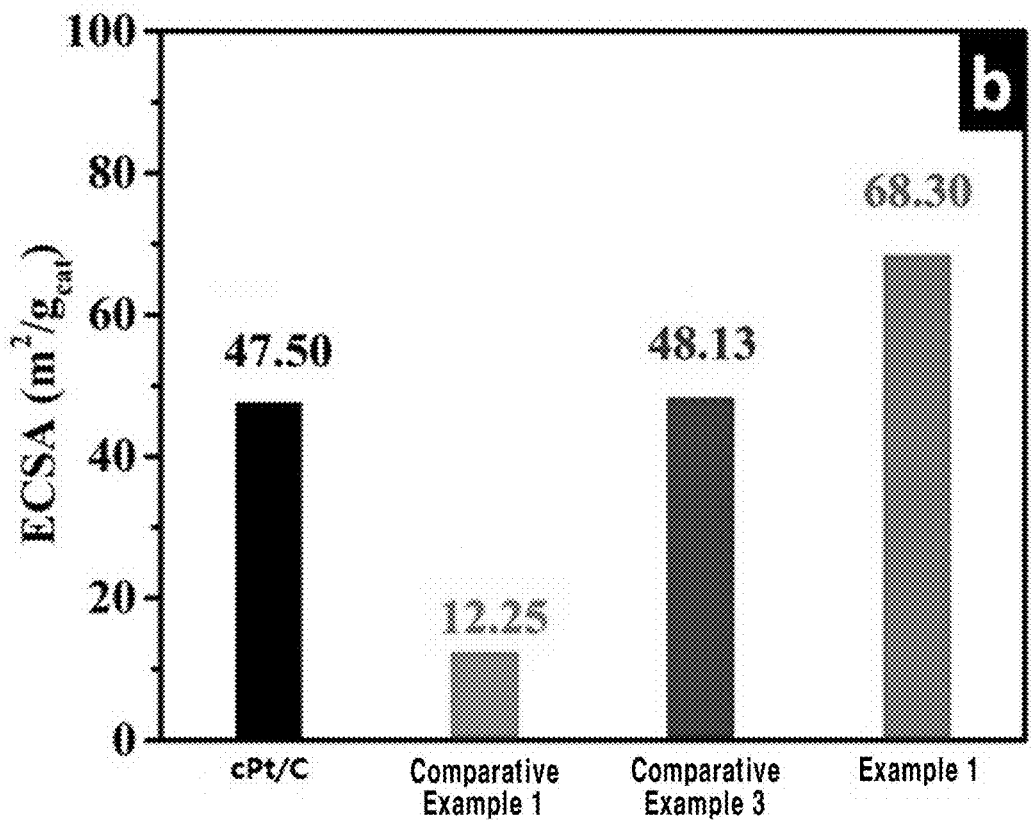

In FIG. 4, (a) presents CV curves plotted from the electrochemical measurements; and (b) shows the electrochemical surface areas (ECSAs) calculated from the CV curves. In the anodic scan, the onset potential for production of Pd—O was 0.7 V, and the anodic potential for the reduction of Pd—O was 0.7 V. The peaks for hydrogen absorption and adsorption on the surface of the working electrode using the Cdot-Pd nanosponge were observed at 0.13 V and 0.18 V, respectively. The value of $\Delta E_P$ between the peaks for hydrogen absorption and adsorption on this working electrode was smaller than that on the working electrode of Comparative Example 3. It was therefore apparent that the Gdot-Pd nanosponge hybrid had higher reversibility and higher hydrogen underpotential deposition rate than the Cdot-Pd hybrid of Comparative Example 3. This is thought because the three-dimensional nano-network structure not only easily captured hydrogen molecules in the pores, but also re-oxidized them with ease.

The Gdot-Pd nanosponge hybrid of Example 1 had a very high effective surface area due to the three-dimensional network structure and also exhibited far higher electrochemical sensitivity than the Cdot-Pd hybrid of Comparative Example 3 prepared using neither C—PtC nor NaBr as well as the Pd of Comparative Example 1 prepared without Cdot. This proved the Gdot-Pd nanosponge hybrid considerably useful as an electron catalyst.

Figure 5:
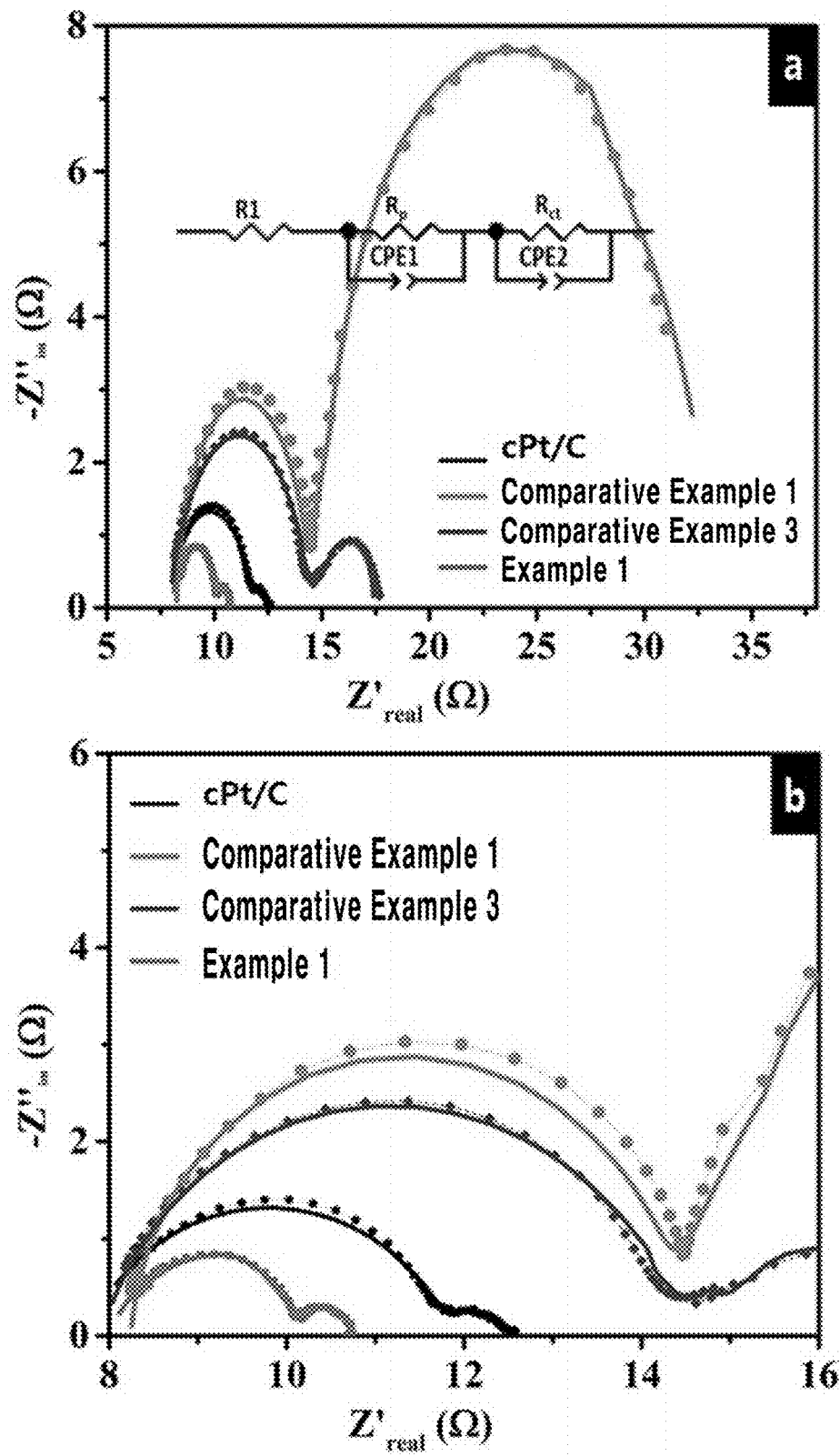
FIG. 5 presents Nyquist plots using an electrochemical impedance spectroscope (EIS)

In FIG. 5, (a) presents Nyquist plots using an electrochemical impedance spectroscope (EIS), that is, impedance spectra measured at $0.0V_{RHE}$; and (b) presents an enlarged diagram of the Nyquist plots in the high-frequency region. The Nyquist plots consist of two semicircles, with the first one occurring in the high-frequency region and having relevance to the porosity of the surface, and the other one occurring in the low-frequency region and having relevance to the charge transfer. The size of resistance value $R_p$ relevant to porosity was in the order of Comparative Example 1>cPt/C>Comparative Example 3>Example 1, and more specifically, 6.65 Ω>4.133 Ω>2.526 Ω>2.222Ω in the respective numeral values. As for the resistance value $R_{ct}$ relevant to the charge transfer, Comparative Example 1 had the highest resistance value of 19.18Ω and Example 1 had the lowest resistance value of 0.50Ω. The size of the resistance value $R_{ct}$ relevant to the charge transfer was in the order of Comparative Example 1>Comparative Example 3>cPt/C>Example 1, and more specifically, 19.18 Ω>7.318 Ω>0.66 Ω>0.50Ω in the respective numeral values.

The following Tables 1 and 2 summarize the HER parameters of various catalysts and the electrochemical impedance spectroscopic (EIS) data fitting parameters calculated from the Nyquist plots at overvoltage of −0.1V.

TABLE 1

| Catalyst | TOF (s$^{-1}$) | | | Mass activity (A/g) at η − −50 mV | $C_{dl}$ (mF/cm$^2$) | $C_s$ (mF/cm$^2$) |
| --- | --- | --- | --- | --- | --- | --- |
| | $\eta_{-35\,mV}$ | $\eta_{-50\,mV}$ | $\eta_{-100\,mV}$ | | | |
| cPt/C | 99.6 | 216.5 | 1024.5 | 329.5 | — | — |
| Comparative Example 1 | 21.9 | 42.9 | 182.4 | 77.8 | 7.92 | 0.04 |
| Comparative Example 3 | 64.7 | 140.9 | 724.2 | 255.5 | 28.77 | 0.04 |
| Example 1 | 174.9 | 374.9 | 1214.4 | 679.7 | 53.63 | 0.04 |

TABLE 2

| Parameters | cPt/C | Comparative Example 1 | Comparative Example 3 | Example 1 |
| --- | --- | --- | --- | --- |
| R1 | 8.35 | 8.245 | 8.126 | 7.989 |
| Rp | 4.133 | 6.65 | 2.526 | 2.222 |
| CPE1-T | 0.070791 | 0.012307 | 0.015204 | 0.01628 |
| CPE1-P | 0.77097 | 0.81505 | 0.77925 | 1.046 |
| Rct | 0.66 | 19.18 | 7.318 | 0.50 |
| CPE2-T | 9.4107E−05 | 2.8980E−05 | 5.0283E−05 | 1.4688E−04 |
| CPE2-P | 0.72167 | 0.95688 | 0.8506 | 0.7574 |
| Chi-squared | 0.0021346 | 0.003845 | 0.0020057 | 0.0043906 |

Figure 6:
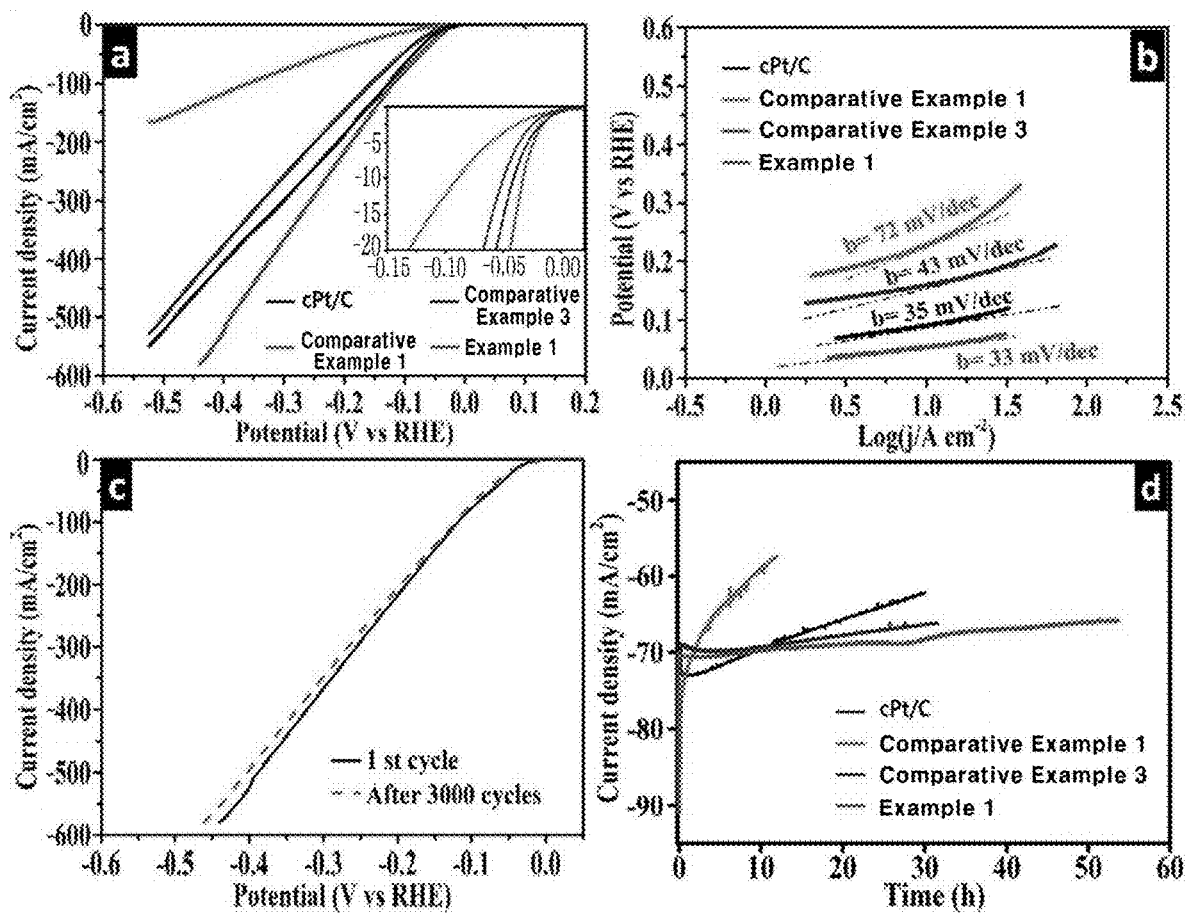
FIG. 6 presents graphs showing the electrochemical catalytic characteristics of the Gdot-Pd hybrid for the hydrogen evolution reaction.

FIG. 6 presents an analytical results of the catalytic activity for the HER reaction in a nitrogen-saturated aqueous solution of 0.5M $H_2SO_4$ according to the linear sweep voltammetry (LSV). The detailed data are presented in Table 3. In FIG. 6, (a) presents polarization curves and the overvoltage at 10 mA/cm$^2$ (inner diagram); (b) presents Tafel plots measured at a scan rate of 10 mV/s and a rotation speed of 1600 rpm in an aqueous solution of 0.5 H$_2$SO$_4$; (c) presents LSV curves of the Gdot-Pd nanosponge electrode after the 1$^{st}$ and 300$^{th}$ cycles of operation; and (d) presents chronoamperometry graphs at overvoltage of −120 mV$_{RHE}$.

TABLE 3

| Catalysts | Overvoltage (mV) (at 10 mA/cm$^2$) | Tafel slope (mV/dec) | Exchange current density (mA/cm$^2$) | Non-exchange current density (mA/cm$^2$ · mg) | TOF (s$^{-1}$) (at η = 35 mV) |
|---|---|---|---|---|---|
| cPt/C | −40 | 35 | 0.64 | 237.04 | 99.6 |
| Comparative Example 1 | −92 | 72 | 0.15 | 55.55 | 21.9 |
| Comparative Example 3 | −49 | 43 | 0.47 | 174.07 | 64.7 |
| Example 1 | −32 | 33 | 0.76 | 281.48 | 174.9 |

It was apparent from FIG. 6 that the Gdot-Pd nanosponge was superior in the performance for the hydrogen evolution reaction (HER) to the cPt/C as well as the nanoparticles of the comparative examples and hence useful as an electron catalyst. The overvoltage at 10 mA/cm$^2$ is an important variable that needs to be considered in the design of fuel cells and used as a standard variable. The inner diagram in (a) of FIG. 6 shows the overvoltage. As can be seen from the values of Table 3, the overvoltage of the Gdot-Pt nanosponge was −32 mV, lower than that of the commercial cPt/C, −40 mV. In addition, the slope of the Tafel plots also indicated that the hydrogen evolution reaction (HER) was enhanced when using the Gdot-Pd nanosponge rather than the other catalysts. This implicitly suggested that the Gdot-Pd nanosponge had higher catalytic activity for the hydrogen evolution reaction (HER). The exchange current density and the non-exchange current density measured by chronoamperometry were also highest in the Gdot-Pd nanosponge, suggesting that the Gdot-Pd nanosponge was most excellent in the catalytic activity. According to the chronoamperometry, the cPt/C, the Comparative Example 3, and the Gdot-Pd nanosponge had a relatively slow change in the current densities over time, while the Comparative Example 1 had an abrupt decrease in the current densities. Particularly, the Gdot-Pd nanosponge had stable current densities with an elapse of time and hence proved to be excellent in catalytic durability. The durability of the Gdot-Pd nanosponge catalyst can be determined from the LSV curve of (c). As the catalysts normally deteriorate in activities after a long-term use under the acidic conditions the durability of HER catalysts is one of the most critical characteristics. According to the LSV curves, the Gdot-Pd nanosponge had almost no change in the on-set potential or current densities after 3000 cycles of operation and thus excellent in durability. This was because the Gdot surrounding the surface of the nanosponge structure functions to protect the Pd catalyst. In contrast, the Comparative Example 3 or the cPt/C catalyst had a great decrease in the current densities after 3000 cycles of operation (data not shown).

Figure 7:
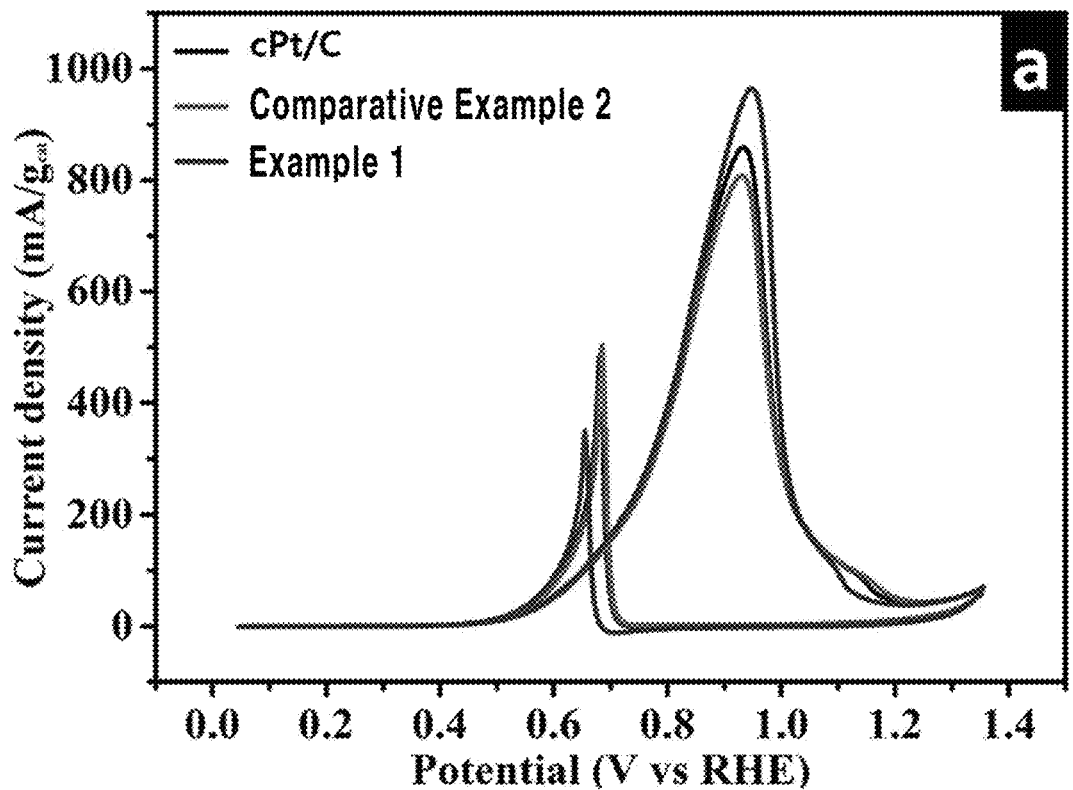
FIG. 7 presents graphs showing the electrochemical catalytic characteristics of the Gdot-Pd hybrid for the methanol oxidation reaction.
Figure 7:
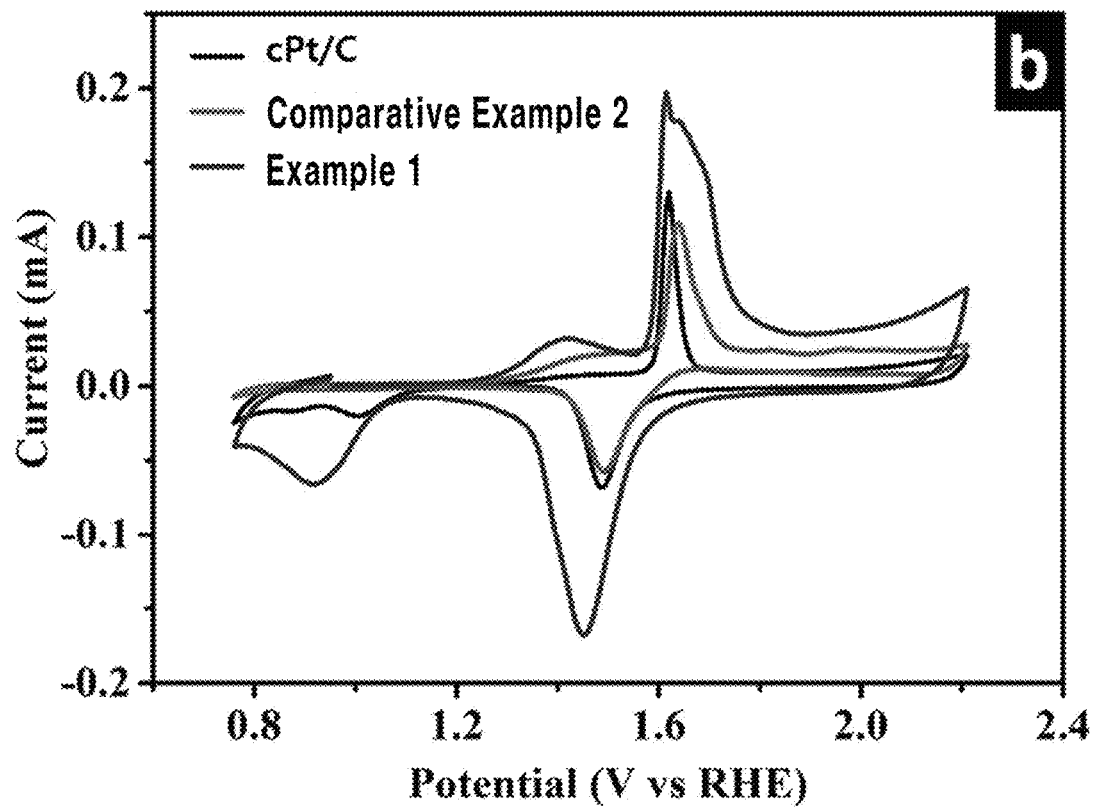

In FIG. 7, (a) presents CV curves measured at a scan rate of 50 mV/s in a solution of 0.1M KOH+1.0M CH$_3$OH for the sake of evaluating the catalytic activity for the methanol oxidation reaction (MOR); and (b) presents CO stripping CV curves measured at a scan rate of 50 mV/s in a 0.1M KOH solution.

Referring to (a) of FIG. 7, the Gdot-Pd catalyst was superior in the electrochemical activity to the other catalysts. In addition, (b) of FIG. 7 shows that the Gdot-Pd catalyst was excellent in resistance to CO and thus resistant to poisoning.

What is claimed is:

1. A method for preparing a graphene dot-palladium hybrid having a nanosponge structure, the method comprising reducing a palladium precursor in the presence of a carbon dot and sodium bromide.

2. The method according to claim 1, wherein the nanosponge structure of the graphene dot-palladium hybrid is encapsulated by a graphene dot.

3. The method according to claim 2, wherein the carbon dot is doped with at least one heteroatom selected from the group consisting of nitrogen, sulfur, phosphorus, and boron.

4. The method according to claim 2, wherein 1 to 200 parts by weight of the carbon dot and 50 to 2000 parts by weight of the sodium bromide are used with respect to 100 parts by weight of the palladium precursor.

5. The method according to claim 1, wherein the carbon dot is doped with at least one heteroatom selected from the group consisting of nitrogen, sulfur, phosphorus, and boron.

6. The method according to claim 1, wherein 1 to 200 parts by weight of the carbon dot and 50 to 2000 parts by weight of the sodium bromide are used with respect to 100 parts by weight of the palladium precursor.

7. A graphene dot-palladium hybrid catalyst having a nanosponge structure.

8. The graphene dot-palladium hybrid catalyst according to claim 7, wherein the graphene dot-palladium hybrid has the nanosponge structure encapsulated by a graphene dot.

9. The graphene dot-palladium hybrid catalyst according to claim 8, wherein the graphene dot is doped with at least one heteroatom selected from the group consisting of nitrogen, sulfur, phosphorus, and boron.

10. A catalyst electrode comprising the graphene dot-palladium hybrid catalyst of claim 8.

11. The graphene dot-palladium hybrid catalyst according to claim 7, wherein the graphene dot is doped with at least one heteroatom selected from the group consisting of nitrogen, sulfur, phosphorus, and boron.

12. A catalyst electrode comprising the graphene dot-palladium hybrid catalyst of claim 7.

* * * * *